(12) United States Patent
Lucier et al.

(10) Patent No.: US 6,318,344 B1
(45) Date of Patent: Nov. 20, 2001

(54) DEAD-HEADED FUEL DELIVERY SYSTEM USING A SINGLE FUEL PUMP

(75) Inventors: Peter E. Lucier, Chicago; Richard P. Kolb, Prairieview, both of IL (US)

(73) Assignee: Bombardier Motor Corporation of America, Grant, FL (US)

(*) Notice: Subject to any disclaimer, the term of this patent is extended or adjusted under 35 U.S.C. 154(b) by 0 days.

(21) Appl. No.: 09/610,793

(22) Filed: Jul. 6, 2000

(51) Int. Cl.⁷ .................................................. F02M 33/04
(52) U.S. Cl. ............................................. 123/516; 123/497
(58) Field of Search ..................................... 123/497, 516

(56) References Cited

U.S. PATENT DOCUMENTS

| | | | |
|---|---|---|---|
| 5,115,784 | * | 5/1992 | Mito et al. ............................ 123/516 |
| 5,119,790 | * | 6/1992 | Olson ................................... 123/516 |
| 5,389,245 | * | 2/1995 | Jaeger et al. ......................... 123/516 |
| 5,740,783 | | 4/1998 | Learman et al. ..................... 123/497 |
| 5,819,711 | * | 10/1998 | Motose ................................ 123/516 |
| 6,055,962 | | 5/2000 | Kirk ..................................... 123/516 |
| 6,109,246 | * | 8/2000 | Takayanagi et al. ................ 123/516 |
| 6,250,287 | * | 6/2001 | Wickman et al. .................... 123/497 |
| 6,253,742 | * | 7/2001 | Wichman et al. .................... 123/516 |

* cited by examiner

*Primary Examiner*—Thomas N. Moulis
(74) *Attorney, Agent, or Firm*—Cook & Franks SC; Timothy J. Ziolkowski

(57) ABSTRACT

A dead-headed or returnless fuel delivery system uses a single electric fuel pump to deliver fuel to a two-stroke fuel injected engine. The fuel pump draws fuel from a fuel tank via a fuel supply network or a fuel supply line, transfers the fuel through a fuel connector and a fuel filter, and delivers the fuel to a vapor separator. Fuel is then distributed to the fuel injectors without returning any fuel to the fuel delivery system. An engine control unit (ECU), connected to a pressure sensor, supplies a fuel supply signal to the fuel pump to maintain the supplied pressure P at a reference pressure Po.

26 Claims, 3 Drawing Sheets

DEAD-HEADED FUEL DELIVERY SYSTEM USING A SINGLE FUEL PUMP

BACKGROUND OF THE INVENTION

The present invention relates generally to a fuel delivery system for a two-stroke engine and, more particularly, to a fuel delivery system that employs a combination of a single electric fuel pump in a dead-headed or returnless fuel supply network to deliver fuel to a two-stroke engine.

Fuel injection systems are used to supply fuel to many modern automobile engines because their ability to precisely meter fuel flow and accurately control the mixture of fuel and air delivered to an engine dramatically improves engine performance while reducing engine exhaust gas emissions. In one type of fuel injection system, a fuel pump transfers fuel under high pressure directly from a fuel tank to a fuel rail connected to the individual fuel injectors of the engine. Excess fuel not used by the fuel injectors during periods of low engine demand is returned to the fuel tank. Unfortunately, the returned fuel can vaporize or become aerated and foamy, which can lean out the air-fuel mixture delivered to the engine by the fuel pump.

As a result of recent passage of stringent emissions regulations and consumer demand for better performance, there is an increasing demand to employ fuel injection systems in two-stroke engines such as outboard marine engines. However, because the operating environment for outboard marine engines differs enormously from the operating environment for automobile engines, the design engineer faces considerable challenges not faced by the designer of automobile engines. For example, in order to prevent fuel from leaking from the fuel injection system and possibly igniting, U.S. Coast Guard regulations do not allow the use of a pressurized fuel line from a remote fuel tank to inboard engines. While outboards are typically exempt from the federal regulations, ABYC (American Board & Yacht Council) standards, which reflect the federal regulations, are generally applicable. U.S. Coast Guard regulations also prohibit the return of excess fuel from the fuel injectors to the fuel tank, as is typically done in automotive fuel injection systems. Hence, many fuel injection systems of the type commonly used in automobile engines are not usable in marine engines and some other two-stroke engines.

One proposed solution to the problem of injecting fuel in a two-stroke engine without requiring the use of a pressurized external fuel line or a fuel return system requires dual fuel pumps for delivering fuel to the engine. A fuel delivery system 80 incorporating this proposed solution is schematically illustrated in FIG. 1. The fuel delivery system 80 includes first and second fuel pumps 88 and 92 that are located in a fuel supply line 84 and that are collectively configured to pump fuel from a fuel tank 82 to fuel injectors of the engine. In use, fuel is transferred first, by suction through the fuel supply line 84 from fuel tank 82 to fuel pump 88 through a primer bulb 86. (The primer bulb 86 is used only to prime the system with fuel before the start-up.) From the first fuel pump 88, fuel is transferred through the fuel supply line 84 to a vapor separator 90, where entrained vapor in the fuel is removed via a vent 98. Finally, the second fuel pump 92 transfers fuel from the fuel supply line 84 to all of the fuel injectors at a second, higher pressure than the first pressure generated by the first fuel pump 88. A pressure regulator 96 regulates the fuel pressure to the fuel injectors from the second fuel pump 92. Excess fuel from the second fuel pump 92 returns through the pressure regulator 96 to the vapor separator 90 through a fuel return line 94. The returned fuel is then available for use by the second fuel pump 92.

The pumping of excess fuel needlessly wastes power. Consequently, the first fuel pump 88 and the second fuel pump 92 run more often than necessary and use more power than is needed to supply an adequate amount of fuel at an adequate pressure under most engine operating condition. Also, the return of fuel to the vapor separator 90 carries engine heat to the fuel delivery system 80 that can increase the temperature and create vapor in the fuel delivery system. The increased temperature may cause fuel to flash into a vapor, leading to an effect commonly referred to as vapor lock. Vapor lock can result in erratic engine operation, loss of power output, or even cause the engine to stall or overheat.

Another major disadvantage of the fuel delivery system 80 illustrated in FIG. 1 is that it requires two fuel pumps 88 and 92. In some outboards, the first pump is a lift pump and is crankcase pulse driven while the second pump is electric. In others, both are electric. This can be problematic because electrical power demands on boats are rising due to a proliferation of electrically powered devices. These devices include convenience lights, headlights, compact disc players, and fish-locaters, as well as other electric power consuming devices and instruments. Every effort is being made to minimize the electrical power consumption of all outboard marine engine components in order to permit the use of a relatively small battery and/or alternator. These efforts may be frustrated if the engine's electrical system must supply power to two separate electric pumps.

Although the above disclosed prior art has enjoyed acceptance, further improvements remain desirable. It would therefore be desirable to provide a dead-headed or returnless fuel delivery system with a single electric fuel pump, which is low in cost, and which enhances engine fuel economy.

SUMMARY OF THE INVENTION

The invention relates to a dead-headed or returnless fuel delivery system for a two stroke engine such as an outboard marine engine and to a method of using a single electric fuel pump to deliver fuel to the engine. The system includes a fuel supply network or fuel supply line that connects a fuel tank to a vapor separator. An engine control unit (ECU) receives a fuel pressure signal from a pressure sensor and transmits a fuel supply signal to the single electric fuel pump. During engine operation, the single fuel pump draws fuel from the fuel tank via the fuel supply network and delivers the fuel to the vapor separator. The vapor separator then distributes the fuel to each fuel injector. No fuel is returned to the fuel delivery system from the injectors. The pressure of the delivered fuel can be maintained at a reference pressure by suitable operation of the pump under the control of the ECU.

BRIEF DESCRIPTION OF THE DRAWINGS

The drawings illustrate the best mode presently contemplated for carrying out the invention.

DETAILED DESCRIPTION OF THE INVENTION

Figure 1:
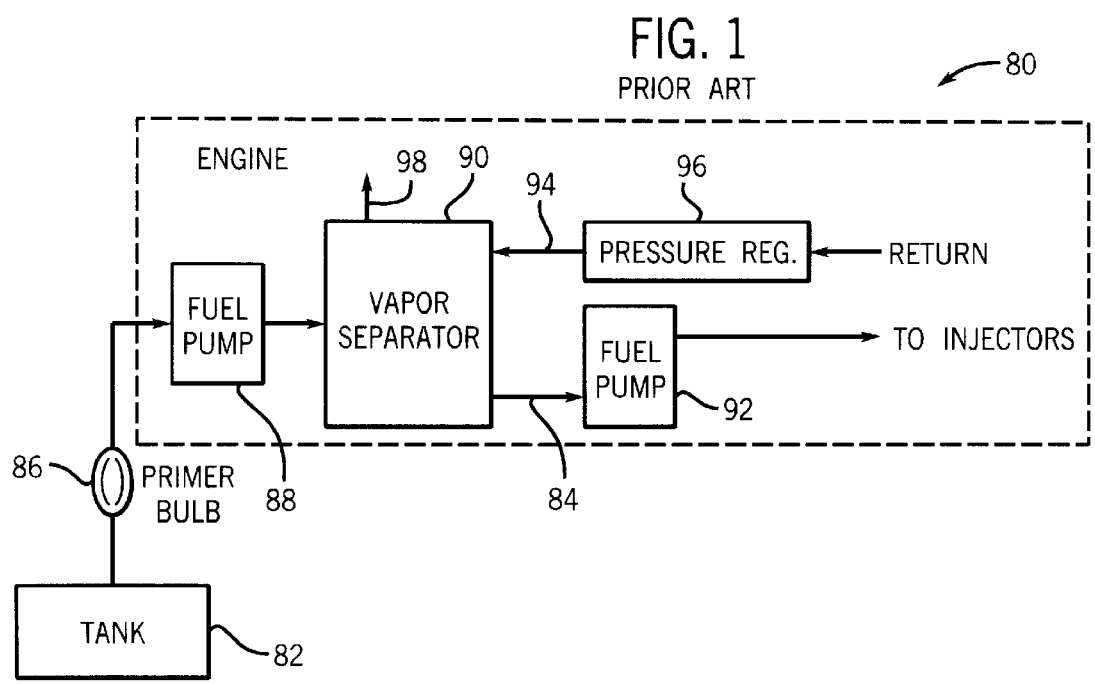
FIG. 1 is a schematic diagram of a prior art fuel delivery system employing two fuel pumps.
Figure 2:
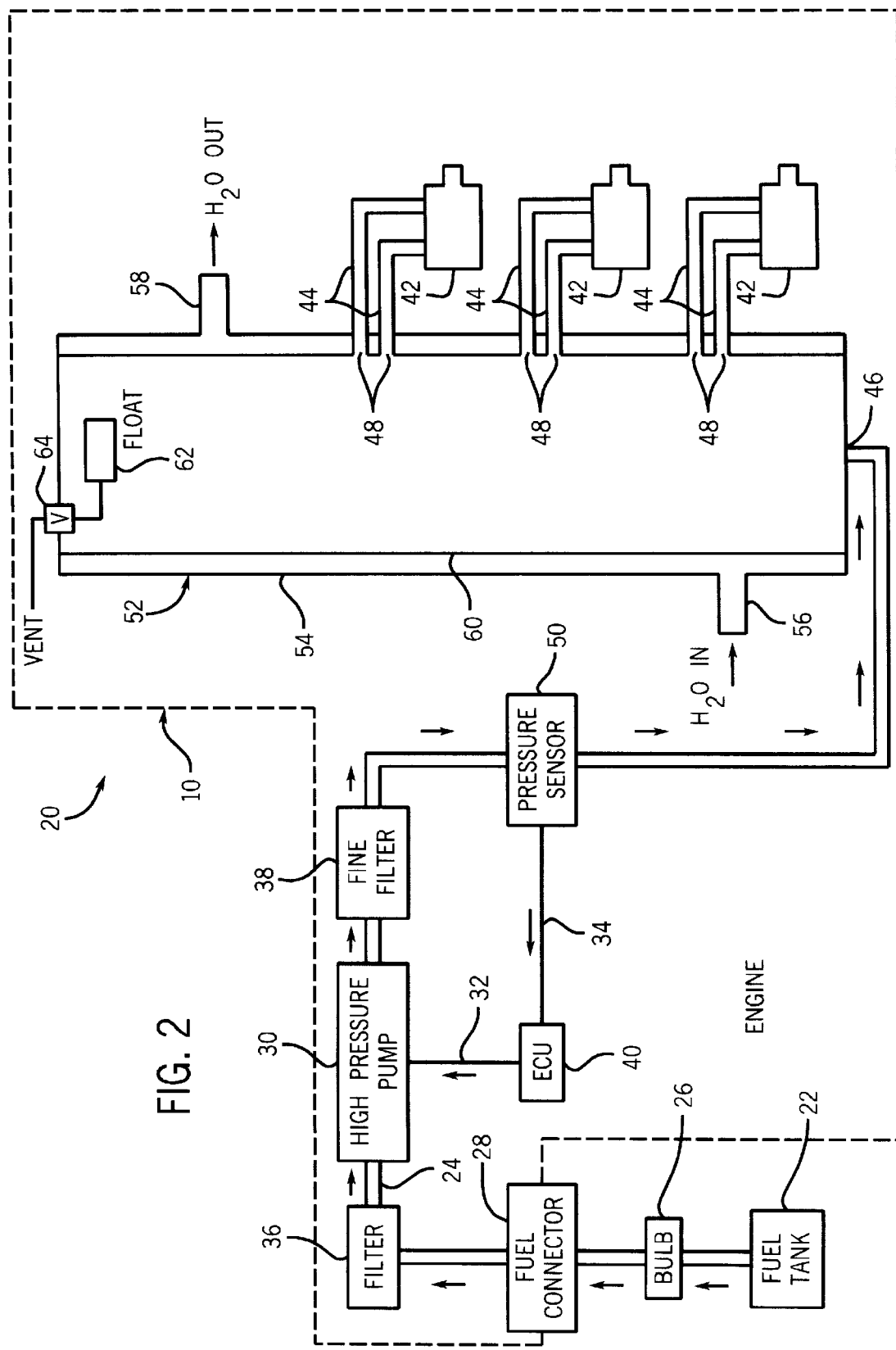
FIG. 2 is a schematic diagram of a dead-headed fuel delivery system employing a single electric fuel pump in accordance with a preferred embodiment of the present invention.

Referring to FIG. 2, a preferred embodiment of a dead-headed or returnless fuel delivery system 20 is illustrated that employs a single high-pressure electric fuel pump 30 to deliver fuel to all injectors 42 of an engine 10. Most of the system 20 is located on the engine 10. The only external components are a fuel tank 22 and a primer bulb 26. The primer bulb 26 is used only to prime the system 20 with fuel prior to starting the engine 10. The pump 30 draws fuel from the fuel tank 22 via a fuel supply network 24 and transfers the fuel into the engine 10 through a fuel connector 28. The fuel then flows into a fuel filter 36, which removes particulate sediment in the fuel before the fuel enters the pump 30. Another fuel filter 38 is located downstream the pump 30.

A vapor separator 52, located downstream of the pump 30, removes vapor from the pressurized fuel and distributes the pressurized fuel to all fuel injectors 42 of the engine 10 during engine operation. The vapor separator 52 includes a standpipe 60 and a liquid coolant jacket 54 that envelops the standpipe 60. The liquid coolant jacket 54 controls the temperature of the fuel entering the fuel injectors 42. The liquid coolant jacket has an inlet port 56 and an outlet port 58 for circulating liquid coolant through the liquid coolant jacket 54. The liquid coolant may, for example, comprise engine coolant supplied by the engine's coolant pump (not shown). To remove vapor that may be entrained by the liquid fuel, a float 62 and a vent valve 64 are mounted in the standpipe 60. The vent valve 64 opens when the float 62 rises under the buoyant force of fuel in the standpipe 60. A vapor separator suitable for these purposes is disclosed in U.S. Pat. No. 6,012,434, the subject matter of which is hereby incorporated by reference.

The standpipe 60 has an inlet 46 coupled to the fuel supply network 24 and a plurality of outlets 48 coupled to the injectors 42 via fuel supply lines 44. Two fuel supply lines 44 are provided for each injector 42. Use of the dual fuel supply lines 44 permits the fuel delivery system 20 to be retrofitted onto an existing outboard marine engine without a major overhaul design of the engine's fuel injectors. That is, each injector of the typical outboard marine engine design has a supply line for transferring fuel to the injector and a return line for returning excess fuel to the rail from the injector. The preferred embodiment uses both the supply and return lines as dual fuel supply lines 44 to deliver fuel to each fuel injector 42. Alternatively, a single fuel supply line would be sufficient to deliver fuel to each fuel injectors if the injectors lacked dual lines.

A pressure sensor 50 is located in the fuel supply network 24 downstream of the fuel pump 30. An engine control unit (ECU) 40 receives a pressure signal 34 from the pressure sensor 50 and transmits a fuel supply signal 32 to the fuel pump 30. Based at least in part on these signals, the ECU 40 controls the operation of the pump 30 to maintain constant pressure at each fuel injector 42 so that each fuel injector 42 precisely meters proper quantities of fuel for efficient operation of the engine 10. The ECU 40 also operates in conjunction with the pump 30 to prevent any time lag in the fuel delivery associated with overcoming inertia of the pump components during an increase in fuel demand.

Figure 3:
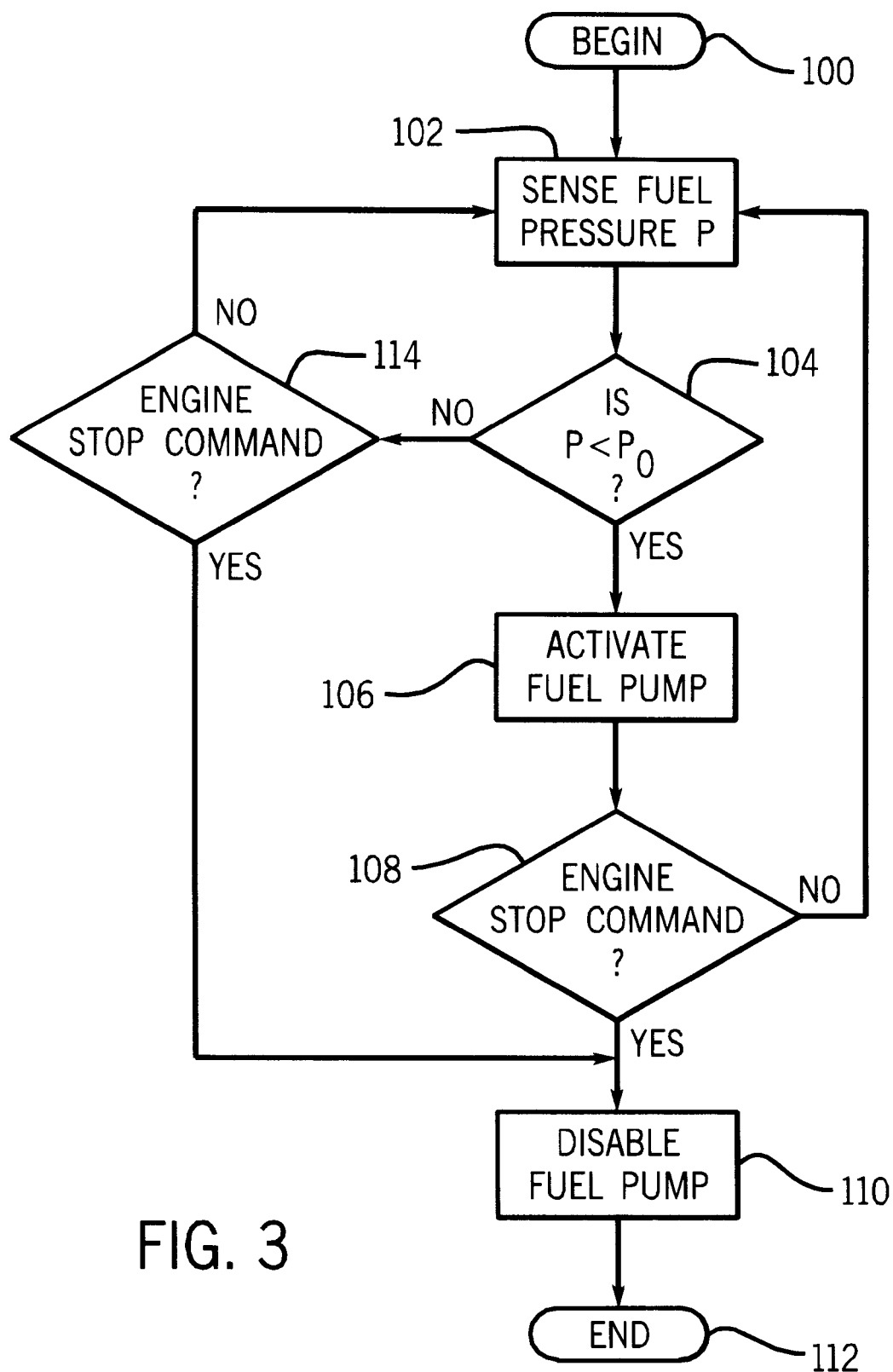
FIG. 3 is a flowchart illustrating operation of the dead-headed fuel delivery system of FIG. 2.

The flowchart of FIG. 3 shows operation of the dead-headed fuel delivery system 20 under the control of the ECU 40. At BEGIN 100 occurring upon engine start-up, the fuel pressure P is sensed by the pressure sensor 50 at 102 and then compared to a reference pressure Po at 104. Po may be a constant pressure or may vary based on engine load and speed conditions as sensed by other sensors (not shown). If P is less than Po, ECU 40 transmits a fuel supply signal to the pump 30 at 106, causing the pump 30 to deliver fuel to the vapor separator 52 at the reference pressure Po. The ECU 40 then determines at 108 whether the engine 10 has received a stop command from the operator. If so, the fuel pump 30 is disabled at 110, and the routine proceeds to END at 112. If not, the routine cycles back through the fuel pressure sensing and control operations at 102, 104, etc.

If the routine determines at 104 that the sensed discharge fuel pressure P is the same as or higher than the reference pressure Po, indicating that the pump 30 need not be operated at that time, the ECU 40 determines at 114 whether the engine 10 has received a stop command from the operator. If so, the fuel pump 30 is disabled at 110, and the routine proceeds to END at 112. If not, the routine cycles back through the fuel pressure sensing and control operations at 102, 104, etc.

The combination of the dead-headed fuel supply network 24 and the single electric fuel pump 30 provides a distinct advantage over all the existing prior art. The optimum quantity of the fuel will always be delivered to the engine 10 for complete combustion. The fuel supply system 20 therefore requires no return line.

A significant aspect of the present invention is that the dead-headed fuel delivery system 20 operates with only a single electric fuel pump to deliver fuel to an outboard marine engine and does not return fuel to the fuel delivery system 20 from the injectors 42. As such, it reduces operating costs and electrical loads while enhancing fuel economy and engine performance when compared to non-dead-headed systems having dual fuel pumps. It is further recognized that other various equivalents, alternatives, and modifications are possible within the scope of the appended claims.

We claim:

1. A dead-headed fuel delivery system with a single fuel pump comprising:
    (A) a fuel tank located externally of a two-stroke engine; and
    (B) a fuel delivery system having:
        (1) a vapor separator connected to at least one fuel injector of the engine and having an atmospheric ventilation system;
        (2) a fuel supply network connecting the fuel tank to the vapor separator to supply fuel to the fuel injector without a separate fuel return line; and
        (3) a single electric fuel pump disposed in the fuel supply network to supply fuel to the engine via the vapor separator.

2. The fuel delivery system of claim 1 further comprising a pressure sensor disposed in the fuel supply network and configured to sense fuel pressure in the fuel supply network and to produce a pressure signal in response thereto, and an engine control unit connected to the pressure sensor and configured to receive the fuel pressure signal from the pressure sensor and to transmit a fuel supply signal to the single fuel pump.

3. The fuel delivery system of claim 1 wherein the pressure sensor and the engine control unit are connected to provide feedback to the single fuel pump to maintain a commanded pressure in the fuel delivery system without returning any fuel to the fuel delivery system from the injector.

4. The fuel delivery system of claim 1 wherein the pressure sensor is disposed in the fuel supply network downstream from the single fuel pump.

5. The fuel delivery system of claim 1 wherein the vapor separator includes a standpipe having an inlet connected to the single fuel pump and an outlet connected to the fuel injector.

6. The fuel delivery system of claim 5 wherein the fuel injector is connected to the vapor separator via a dual fuel supply line.

7. The fuel delivery system of claim 5 wherein the standpipe is enveloped in a liquid coolant jacket.

8. The fuel delivery system of claim 7 wherein the liquid coolant jacket has an inlet port and an outlet port for circulating liquid coolant through the liquid coolant jacket.

9. The fuel delivery system of claim 1 further comprising a primer bulb located in the fuel supply network externally of the engine.

10. The fuel pump delivery system of claim 1, wherein the engine is an outboard marine engine.

11. A dead-headed fuel delivery system with a single fuel supply comprising:

(A) a fuel tank;

(B) a vapor separator connected to at least one fuel injector of a two-stroke engine without any return lines leading from the fuel injector to the fuel delivery system;

(C) a fuel supply network connecting the fuel tank to the vapor separator;

(D) a single electric fuel pump in the fuel supply network at a location outside of the fuel tank;

(E) a pressure sensor located in the fuel supply network and configured to sense fuel pressure in the fuel supply network and to produce a pressure signal in response thereto; and (F) an engine control unit connected to the pressure sensor and configured to receive the fuel pressure signal thereof and to communicate a fuel supply signal to the single fuel pump.

12. The fuel delivery system of claim 11 wherein the pressure sensor is disposed in the fuel supply network downstream from the single fuel pump.

13. The fuel delivery system of claim 11 wherein the vapor separator includes a standpipe having an inlet connected to the single fuel pump and an outlet connected to the fuel injector.

14. The fuel delivery system of claim 11 wherein the fuel injector is connected to the vapor separator via a dual fuel supply line.

15. The fuel delivery system of claim 11 wherein the standpipe is enveloped in a liquid coolant jacket, the liquid coolant jacket having an inlet port and an outlet port for circulating liquid coolant through the liquid coolant jacket.

16. The fuel delivery system of claim 11 further comprising a primer bulb located in the fuel supply network externally of the two-stroke engine.

17. A method for delivering fuel to at least one fuel injector of a two-stroke engine, the method comprising the steps of:

(A) drawing fuel from a fuel tank and transferring the fuel to a single electronic fuel pump through a fuel supply network;

(B) transferring the fuel to a vapor separator from the single fuel pump;

(C) delivering the fuel to the fuel injector from the vapor separator without returning any fuel from the fuel injector to the fuel supply network or the vapor separator.

18. The method of claim 17 farther comprising priming the single fuel pump prior to engine start-up by operating a primer bulb located in the fuel supply network externally of the engine.

19. The method of claim 17 wherein the step of delivering fuel with a single fuel pump further includes controlling the operation of the single fuel pump using an engine control unit and a pressure sensor.

20. The method of claim 17 further comprising controlling the temperature of the fuel in a standpipe of the vapor separator by circulating liquid coolant through a liquid coolant jacket that envelopes the standpipe.

21. The method of claim 20 further comprising venting gas from a vent port of the standpipe under control of a float that rises under a buoyant force of liquid fuel in the standpipe.

22. The method of claim 17, wherein the fuel transferring step comprises supplying fuel to the fuel injector through dual fuel supply lines.

23. A fuel delivery system comprising:

(A) means for drawing fuel from a fuel tank;

(B) means, in fluid communication with the means for drawing fuel, for separating vapor from fuel received from the means for drawing fuel; and (C) means, in fluid communication with the means for separating vapor, for delivering fuel from the means for separating vapor to a fuel injector without returning any fuel from the fuel injector to the means for drawing fuel or the means for separating vapor.

24. The fuel delivery system of claim 23 wherein the means for drawing fuel comprises a single electric pump.

25. The fuel delivery system of claim 23 wherein the means for separating vapor comprises a vapor separator including a standpipe and a liquid coolant jacket which envelops the standpipe.

26. The fuel delivery system of claim 23 wherein the means for delivering fuel comprise dual fuel supply lines connecting the means for separating vapor to the fuel injector.

* * * * *